(12) United States Patent
Legg

(10) Patent No.: US 9,338,263 B2
(45) Date of Patent: May 10, 2016

(54) MULTIPLEXING PACKETS IN HIGH SPEED DOWNLINK PACKET ACCESS COMMUNICATIONS

(71) Applicant: Cisco Technology, Inc., San Jose, CA (US)

(72) Inventor: Peter Jonathon Legg, Swindon (GB)

(73) Assignee: Cisco Technology, Inc., San Jose, CA (US)

( * ) Notice: Subject to any disclaimer, the term of this patent is extended or adjusted under 35 U.S.C. 154(b) by 217 days.

(21) Appl. No.: 13/931,199

(22) Filed: Jun. 28, 2013

(65) Prior Publication Data

US 2013/0286986 A1 Oct. 31, 2013

Related U.S. Application Data

(63) Continuation of application No. 11/796,181, filed on Apr. 27, 2007, now Pat. No. 8,483,125.

(51) Int. Cl.
*H04L 29/06* (2006.01)
*H04W 28/06* (2009.01)
*H04W 72/04* (2009.01)
*H04W 80/02* (2009.01)

(52) U.S. Cl.
CPC ............. *H04L 69/22* (2013.01); *H04W 28/06* (2013.01); *H04W 72/04* (2013.01); *H04W 80/02* (2013.01)

(58) Field of Classification Search
CPC ...... H04L 69/22; H04W 72/04; H04W 28/06; H04W 80/02

USPC ......... 370/310, 328, 329, 431, 432, 436, 464, 370/465, 469, 474

See application file for complete search history.

(56) References Cited

U.S. PATENT DOCUMENTS

| | | | |
|---|---|---|---|
| 2005/0063347 A1* | 3/2005 | Sarkkinen et al. ............ | 370/338 |
| 2005/0111410 A1* | 5/2005 | Bazar ............................ | 370/331 |
| 2005/0185608 A1 | 8/2005 | Lee et al. | |
| 2008/0165755 A1* | 7/2008 | Marinier et al. .............. | 370/342 |
| 2008/0219195 A1 | 9/2008 | Pani et al. | |

FOREIGN PATENT DOCUMENTS

| | | |
|---|---|---|
| EP | 1748593 A1 | 1/2007 |
| EP | 2466780 A1 | 6/2012 |
| WO | 2006113829 A2 | 10/2006 |

OTHER PUBLICATIONS

Huawei, "PDU multiplexing in MAC-hs layer," 3GPP TSG-RAN-WG2 Meeting #54, R2-062239, Tallinn, Esthonia (Aug. 28-Sep. 1, 2006).
Third Generation Partnership Project, "Technical Specification Group Radio Access Network; Medium Access Control (MAC) protocol specification (Release 7)," 3GPP TS 25.321 V7.4.0 (Mar. 2007).
Office Action, Japanese Patent Application No. 2013-119226, dated Apr. 16, 2014.

(Continued)

*Primary Examiner* — Obaidul Huq

(57) ABSTRACT

Processing a received multiplexed data packet on a downlink channel, in a high speed downlink packet access (HSDPA) communication, utilizing protocol layers is disclosed. The multiplexed data packet may have multiple data packets for two medium access control (MAC) entities. A header of the multiplexed data packet may indicate a number of data packets in the multiplexed data packet and a size of each of the multiple data packets.

16 Claims, 6 Drawing Sheets

(56) References Cited

OTHER PUBLICATIONS

Third Generation Partnership Project, "Technical Specification Group Radio Access Network; Medium Access Control (MAC) protocol specification (Release 7)," 3GPP TSG-RAN WG2 Meeting #56bis, R2-07xxxx (date unknown).

Ericsson, "L2 Enhancements CR to MAC," Change Request, 25.321 CR Draft V7.3.0, 3GPP TSG-RAN2 Meeting #57, R2-071061 (St. Louis, Feb. 12-16, 2007).

Huawei, "Concatenated MAC-hs PDU," 3GPP TSG-RAN-WG2 Meeting #53, R2-061211, Shanghai, China, May 8-12, 2006).

Ericsson, "L2 enhancements," 3GPP TSG-RAN WG2 Meeting #56bis, R2-071586, St. Louis, USA, (Mar. 2007).

Ericsson, "L2 Enhancements: Stage 2", Change Request, 25.308 CR 0018, Rev. 1, V7.1.0, 3GPP TSG-RAN2 Meeting #57, R2-071077, St. Louis, USA, (Feb. 2007).

Ericsson et al., "Introduction of Improved L2 support for high data rates and Enhanced CELL_FACH state," 3GPP TSG-RAN WG2 Meeting #58, CR0318 (R2-072258), Kobe, Japan, (May 2007).

Ericsson, "L2 enhancements CR to MAC," Change Request, 25.321 CR Draft, V7.3.0, 3GPP TSG-RAN2 Meeting #57, R2-070810, St. Louis, USA, (Feb. 2007).

Office Action, Japanese Patent Application No. 2014-176923 (Sep. 11, 2015).

\* cited by examiner

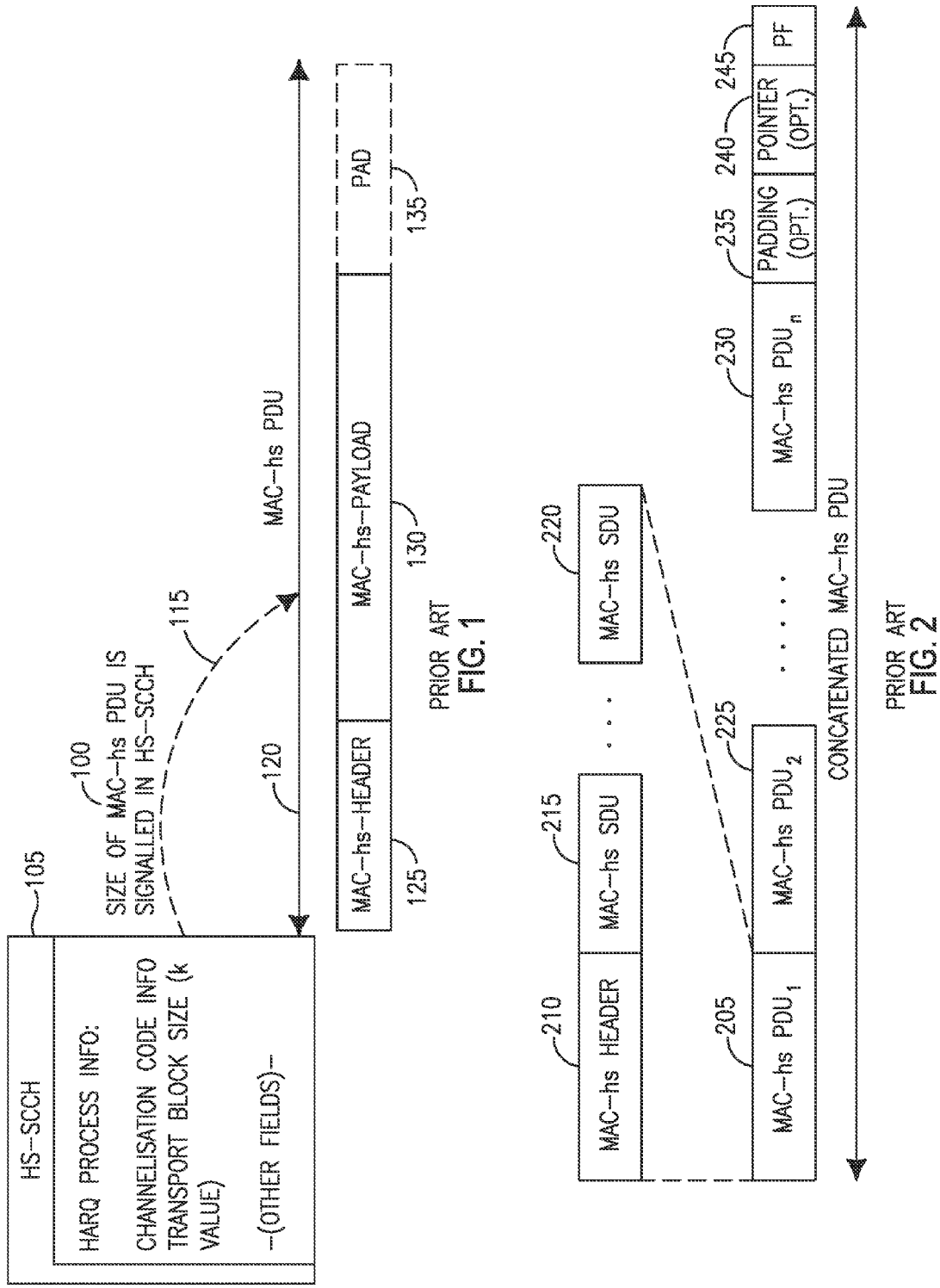

MULTIPLEXING PACKETS IN HIGH SPEED DOWNLINK PACKET ACCESS COMMUNICATIONS

CROSS REFERENCE TO RELATED APPLICATIONS

This application is a continuation of U.S. patent application Ser. No. 11/796,181 filed Apr. 27, 2007, the contents of which is hereby incorporated by reference herein.

FIELD OF THE INVENTION

This invention relates to code division multiple access (CDMA) systems, and particularly (though not exclusively) to wireless CDMA systems such as 3rd Generation Partnership Project (3GPP) systems utilizing packet data services and employing High Speed Downlink Packet Access (HSDPA).

BACKGROUND OF THE INVENTION

There has been a growth in demand for packet switched wireless data services due to the growth in internet applications. A typical channel over which these data services are delivered is a radio channel. Radio channels are available in an increasing number of frequency bands. A frequency band of particular interest is the IMT-2000 frequency band (at a frequency of about 2 GHz). This frequency band is used for delivery of data services using wideband code division multiple access (W-CDMA) techniques. Two W-CDMA techniques that may be used in this frequency band are frequency division duplex (FDD) techniques and time division duplex (TDD) techniques.

A strategy that is useful when packet data services are transmitted across a fading radio channel is to exploit multi-user diversity. Multi-user diversity may be employed when there are multiple users that are all requesting service concurrently. If the transmitter knows the channel conditions that are being experienced by the receivers that it is serving, it may schedule those users that are experiencing favorable channel conditions in preference to those experiencing unfavorable channel conditions. Furthermore, the scheduler may wish to use less error correction coding or transmit using a higher order modulation when transmitting to users with the better channel conditions (such techniques will increase the instantaneous throughput to those users).

In the 3rd Generation Partnership Project (3GPP) communication systems utilizing packet data services and employing High Speed Downlink Packet Access (HSDPA), the transmitter is referred to as a Node-B (i.e. a 'base station') and the receiver is the user equipment (UE) (often referred to as a 'remote station' or 'subscriber equipment'). The HSDPA system that is specified by 3GPP exploits multi-user diversity in several ways:

The amount of error correcting, coding and modulation applied may be varied between transmissions (for example when applying adaptive modulation and coding (AMC)).

A scheduling function is located in the Node-B. This network element has a shorter round trip delay to the UE than the RNC (Radio Network Controller), which is where the scheduling function is classically located. The Node-B may attempt to always choose users to schedule that are experiencing favorable channel conditions.

The UE reports channel quality directly to the Node-B, allowing the Node-B to make scheduling decisions based on channel quality.

3GPP have specified HSDPA both for the FDD (Frequency Division Duplex) and for the TDD (Time Division Duplex) modes of operation. In both modes of operation, there is a mechanism by which channel quality estimates are fed back from the UE to the Node-B.

In current specifications of HSDPA, notably with respect to a format of medium access control (MAC) layer protocol data units (PDUs), only MAC-hs (high speed) Service Data Units (SDUs) from a single priority queue of a UE can be multiplexed onto one MAC-hs PDU. As illustrated in FIG. 1, a single MAC-hs PDU 120 may be sent to a user equipment (UE), per transmission time interval (TTI). The single MAC-hs PDU contains a MAC-hs header 125, followed by MAC-hs payload 130 (comprising one or more MAC-d PDUs, where a MAC-d pdu is the same as a MAC-hs SDU, but where MAC-d layer is located above the MAC-hs layer in the 3GPP architecture) and finally optional padding 135, if the sum of the above data does not fit a valid MAC-hs PDU size (where the permitted size values are defined in 3GPP TS 25.321, known as 'k' values).

Further, in 100 a size of a single MAC-hs PDU is signaled 115 in the high-speed shared control channel (HS-SCCH) 105. As a consequence of only being able to transmit a single MAC-hs PDU 120 to a UE, only a single priority level of data can be carried.

However, in the MAC-hs logic entity at the network (UMTS Radio Access Network (UTRAN)) side of the communication link, more than one priority queue may belong to the same UE. In effect, this means that if one UE is scheduled to transmit in a TTI, only MAC-hs SDUs from one of the priority queues of the UE can be sent in one MAC-hs PDU. This is the case even though downlink resources in this TTI may allow for transmitting more MAC-hs SDUs than those that are waiting for transmission in any one of the priority queues of this UE.

It has been proposed by Huawei in a document titled 'Concatenated MAC-hs PDU' in 3GPP TSG-RAN-WG2 meeting #51 in Denver, USA, Nov. 13-17, 2006, to concatenate MAC-hs PDUs in the manner illustrated in FIG. 2. As shown in FIG. 2, a concatenated MAC-hs PDU 250 includes multiple MAC-hs PDUs 205, 225, 230 built from different priority queues of the same UE. The format of each MAC-hs PDU follows current specifications, except that there is no padding field since the MAC-hs PDU size is not constrained by the 'k' values; it comprises a MAC-hs header 210 followed by multiple MAC-hs SDUs 215, 220. Since possible padding may be needed for the concatenated PDU, an optional pointer field 240 with typical length of '8' bits or '12' bits is used to indicate the beginning of the padding field 235. A fixed PF (Pointer Flag) 245 with one bit length is located at the end of the concatenated MAC-hs PDU 250, and is used as an indicator to show if the pointer field 240 is present (for example if PF='1') or not (for example PF='0').

There are a number of drawbacks associated with the concatenated PDU proposal outlined above, including:

Existing MAC-hs software developed according to 3GPP cannot be re-used:

The individual MAC-hs PDU structure differs from the existing 3GPP structure

A Concatenated MAC-hs PDU has a new structure that is also handled by MAC-hs.

Therefore, a desire exists for HSDPA communication wherein one or more of the abovementioned disadvantage(s) may be alleviated.

SUMMARY OF THE INVENTION

Accordingly, the embodiments of the invention may mitigate, alleviate or eliminate one or more of the abovementioned disadvantages singly or in any combination.

According to embodiments of the invention, there is provided, a method for generating a high speed downlink packet access (HSDPA) communication. The method comprises concatenating multiple data packets (and in one optional embodiment MAC-hs PDUs); attaching a header to the concatenated multiple data packets to form an extended multiplexed data packet, wherein the header comprises an indication of a size of each of the multiple data packets; and transmitting the extended multiplexed data packet to a remote station on a downlink channel.

Embodiments of the invention may allow improved use of the communication resource in the communication system, for example by superimposing a MAC-hx layer onto the 3GPP MAC-hs layer, while providing additional functionality by re-configuring the transmission of a HS-SCCH 'k' value to provide an indication of the MAC-hx PDU. The invention may allow improved performance, for example, by supporting a transmission of a MAC-hx PDU carrying multiple standard MAC-hs PDUs, whose sizes are defined according to the standard table of permitted sizes (there are 512 permitted sizes, indicated by index k for TDD mode), as identified in the 3GPP standard. The invention may allow improved performance in a cellular network in the provision of a MAC-hx PDU in transmitting multiple MAC-hs PDUs, in the aforementioned manner, allows multiple priority levels to be served in the same TTI, with resulting latency gains and throughput gains.

The invention may be compatible with existing communication systems, such as 3GPP TD-CDMA or TD-SCDMA or W-CDMA-FDD cellular communication systems.

According to some embodiments of the invention, there is provided a base station arranged to generate a high speed downlink packet access (HSDPA) communication. The base station comprises logic for concatenating multiple data packets; logic for attaching a header to the concatenated multiple data packets to form an extended multiplexed data packet, wherein the header comprises an indication of a size of each of the multiple data packets; and a transmitter operably coupled to the logic arranged to concatenate multiple data packets and arranged to transmit the extended multiplexed data packet to a remote station on a downlink channel.

According to an optional feature of the invention, the base station or method employed by the base station may further comprise logic for transmitting, in a separate signaling channel, an indicator of a size of the extended multiplexed data packet. Thus, the indication of a size of the extended multiplexed data packet may be sent to the remote station. The separate signaling channel may be a HS-SCCH communication channel, thereby providing a beneficial use of the HS-SCCH communication channel to identify sizes of multiple individual MAC-hs PDUs, as compared to the prior art identifying the size of a single MAC-hs PDU. In this manner, the k field in the HS-SCCH may be re-used to identify transmission of multiple MAC-hs PDUs.

According to some embodiments, the HS-SCCH communication channel can be used to signal the size of a MAC-hx PDU to a UE that supports the reception of MAC-hx, while at the same time it can be used to signal the size of a MAC-hs PDU to a UE that supports MAC-hs PDU reception, but not MAC-hx reception. Thus, a mixture of legacy UEs (supporting only MAC-hs, as defined by 3GPP) and new UEs (supporting MAC-hx) can be supported in the same cell.

According to other embodiments of the invention, the base station or method employed by the base station may further comprise logic for adding padding bits to the extended multiplexed data packet header to form a byte boundary size transmission. Thus, the first MAC-hs PDU will start on a byte boundary, making extraction of the first MAC-hs PDU easier for the UE. For example, if all the MAC-hs PDUs are chosen to be an integer number of bytes in length, then all MAC-hs PDUs begin at a byte boundary, and therefore all can be easily extracted.

According to other embodiments of the invention, the base station or method employed by the base station may further comprise logic for concatenating multiple data packets from multiple selected priority queues of data packets intended for a single remote station. Thus, when after scheduling the highest priority traffic for a UE, there are spare transmission bits. These spare transmission bits can be used to carry lower priority traffic to the same UE. This reduces latency for lower priority traffic flows and improves the efficiency of the air interface (increased throughput).

According to some embodiments of the invention, the base station, or method employed by the base station, may further comprise logic for concatenating multiple data packets from the same priority queue for a single remote station. This may be advantageous if it is determined later that radio conditions have deteriorated such that the MAC-hx PDU is too large for successful delivery and should be sent as smaller pieces.

According to some embodiments of the invention, the base station or method employed by the base station may further comprise logic for setting a version flag field in the extended multiplexed data packet (MAC-hx PDU) header for identifying the extended multiplexed data packet (MAC-hx PDU) comprises multiple concatenated data packets. Thus, a UE that is capable of either MAC-hs PDU or MAC-hx PDU reception is able to identify which PDU type is being transmitted by the value of the flag. This allows such a UE to roam into cells that do not support the MAC-hx PDU transmissions, but where the UE is still able to receive MAC-hs PDU transmissions.

According to some embodiments of the invention, attaching a header to the concatenated multiple data packets to form an extended multiplexed data packet (MAC-hx PDU) introduces a MAC sub-layer of communication in a 3GPP communication system: namely the MAC-hx sublayer. The MAC-hx sublayer may be located below the MAC-hs layer. Thus, an existing HSDPA implementation (Node B, UE) can be extended to support MAC-hx with only minor changes to the existing MAC-hs software.

According other embodiments of the invention, there is provided a method for receiving a high speed downlink packet access (HSDPA) communication. The method comprises receiving an extended multiplexed data packet (MAC-hx PDU) on a downlink channel wherein the extended multiplexed data packet comprises multiple concatenated (MAC-hs) data packets and decoding a header of the extended multiplexed data packet. The method further comprises determining an indication of a size of each of the multiple data packets from the decoded header; decoding the received extended multiplexed data packet; and using the indication of the size of each of the multiple data packets.

According to some embodiments of the invention, there is provided a remote station for receiving a high speed downlink packet access (HSDPA) communication. The remote station comprises a receiver for receiving an extended multiplexed data packet (MAC-hx PDU) on a downlink channel wherein the extended multiplexed data packet comprises multiple concatenated (MAC-hs) data packets and logic operably coupled to the receiver for decoding a header of the extended multiplexed data packet. The remote station further comprises logic for determining an indication of a size of each of the multiple data packets from the decoded header; and logic for decoding the received extended multiplexed data packet using the indication of the size of each of the multiple data packets.

According to other embodiments of the invention, the remote station or method employed by the remote station may further comprise logic for receiving, in a separate signaling channel, an indicator of a size of the extended multiplexed data packet (MAC-hx PDU). In some embodiments of the invention, the separate signaling channel uses a HS-SCCH communication channel.

The HS-SCCH communication channel may be used to signal a size of a MAC-hx PDU to a UE that supports the reception of MAC-hx, while at the same time the HS-SCCH communication channel may be used to signal a size of a MAC-hs PDU to a UE that supports MAC-hs PDU reception, but not MAC-hx reception. Thus, a mixture of legacy UEs (supporting only MAC-hs, as defined by 3GPP) and new UEs (supporting MAC-hx) can be supported in the same cell.

According to other embodiments of the invention, the remote station or method employed by the remote station may further comprise logic for removing padding bits in the extended multiplexed data packet (MAC-hx PDU) using the indication of the size of each of the multiple data packets. Padding bits may be used to ensure that the size of the MAC-hx PDU is a permitted value (k value) from a set of possible values. The use of k values is defined by 3GPP and ensures that the size of the transmitted PDU can be efficiently signaled on the HS-SCCH channel.

According to other embodiments of the invention, the remote station or method employed by the remote station may further comprise logic for decoding a version flag field in the extended multiplexed data packet (MAC-hx PDU) header to identify that the extended multiplexed data packet (MAC-hx PDU) comprises multiple concatenated data packets. Thus, a UE that is capable of either MAC-hs PDU or MAC-hx PDU reception is able to identify which PDU type is being transmitted by the value of the flag. This allows such a configured UE to roam into cells that do not employ the MAC-hx PDU transmissions, but still enables the UE to be able to receive MAC-hs PDU transmissions. Further, in response to determining whether the received data packet is an extended multiplexed data packet and comprises multiple concatenated (MAC-hs) data packets, the extended multiplexed data packet may be disassembled.

According to some embodiments of the invention, the remote station or method employed by the remote station may further comprise logic for sending each set of concatenated (MAC-hs) data packets to a re-ordering queue distribution entity. Thus, each set of concatenated MAC-hs PDUs can be passed to the appropriate queue, in contrast to the entity used in 3GPP that is configured to only handle a single MAC-hs PDU.

According to other embodiments of the invention, there is provided a communication system supporting high speed downlink packet access (HSDPA) communication. The system comprises at least one base station communicating with a plurality of remote stations. The base station comprises logic for concatenating multiple data packets and logic for attaching a header to the concatenated multiple data packets to form an extended multiplexed data packet (MAC-hx PDU). The header comprises an indication (K) of a size of each of the multiple data packets. The base station further comprises a transmitter operably coupled to the logic arranged to concatenate multiple data packets and arranged to transmit the extended multiplexed data packet (MAC-hx PDU) to a remote station on a downlink channel. The remote station comprises a receiver for receiving the extended multiplexed data packet (MAC-hx PDU) on a downlink channel and logic operably coupled to the receiver for decoding a header of the extended multiplexed data packet. The remote station further comprises logic for determining the indication of the size of each of the multiple data packets from the decoded header and logic for decoding the received extended multiplexed data packet using the indication of the size of each of the multiple data packets.

In other embodiments of the invention, there is provided a computer program product comprising executable program code for generating a high speed downlink packet access (HSDPA) communication. The computer program product comprising program code for concatenating multiple data packets, attaching a header to the concatenated multiple data packets to form an extended multiplexed data packet (MAC-hx PDU), wherein the header comprises an indication (K) of a size of each of the multiple data packets; and transmitting the extended multiplexed data packet (MAC-hx PDU) to a remote station on a downlink channel.

In other embodiments of the invention, there is provided an integrated circuit comprising concatenating logic for concatenating multiple data packets; attaching logic operably coupled to the concatenating logic and for attaching a header to the concatenated multiple data packets to form an extended multiplexed data packet (MAC-hx PDU), wherein the header comprises an indication (K) of a size of each of the multiple data packets.

In some embodiments of the invention, there is provided a computer program product comprising executable program code for receiving an extended multiplexed data packet (MAC-hx PDU) on a downlink channel wherein the extended multiplexed data packet comprises multiple concatenated data packets. The computer program product comprises program code for receiving an extended multiplexed data packet (MAC-hx PDU) on a downlink channel wherein the extended multiplexed data packet comprises multiple concatenated (MAC-hs) data packets and decoding a header of the extended multiplexed data packet. The computer program product comprises further program code for determining an indication of a size of each of the multiple data packets from the decoded header, decoding the received extended multiplexed data packet and using the indication of the size of each of the multiple data packets.

In other embodiments of the invention, there is provided an integrated circuit comprising receiver logic for receiving an extended multiplexed data packet (MAC-hx PDU) on a downlink channel wherein the extended multiplexed data packet comprises multiple concatenated data packets and logic operably coupled to the receiver logic for decoding a header of the extended multiplexed data packet. The integrated circuit further comprises logic for determining an indication of a size of each of the multiple data packets from the decoded header, and logic for decoding the received extended multiplexed data packet using the indication of the size of each of the multiple data packets.

These and other aspects, features and advantages of the invention will be apparent from, and elucidated with reference to, the embodiment(s) described hereinafter.

BRIEF DESCRIPTION OF THE DRAWINGS

FIG. 1 illustrates a known construction of MAC-hs protocol data unit (PDU) with an indication of the MAC-hs PDU length.

FIG. 2 illustrates a known construction of concatenated multiple MAC-hs protocol data units.

Figure 3:
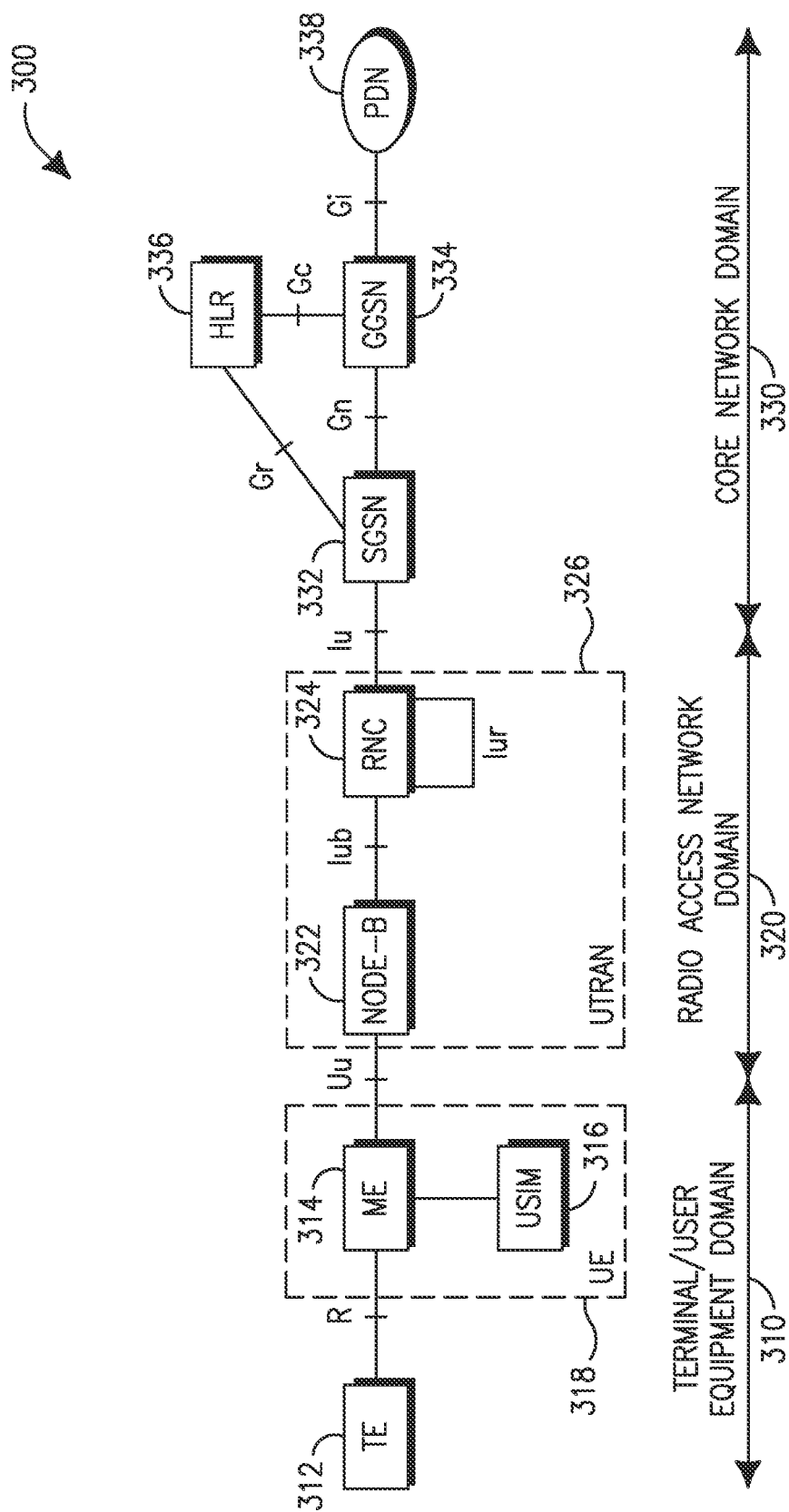

Methods, a communication system, a base station, a remote station, integrated circuits and associated computer products supporting HSDPA communication incorporating embodiments of the invention will now be described, by way of example only, with reference to the accompanying drawing(s), in which:

FIG. 3 shows a block schematic diagram illustrating a 3GPP radio communication system in which an embodiment of the invention may be used.

Figure 4:
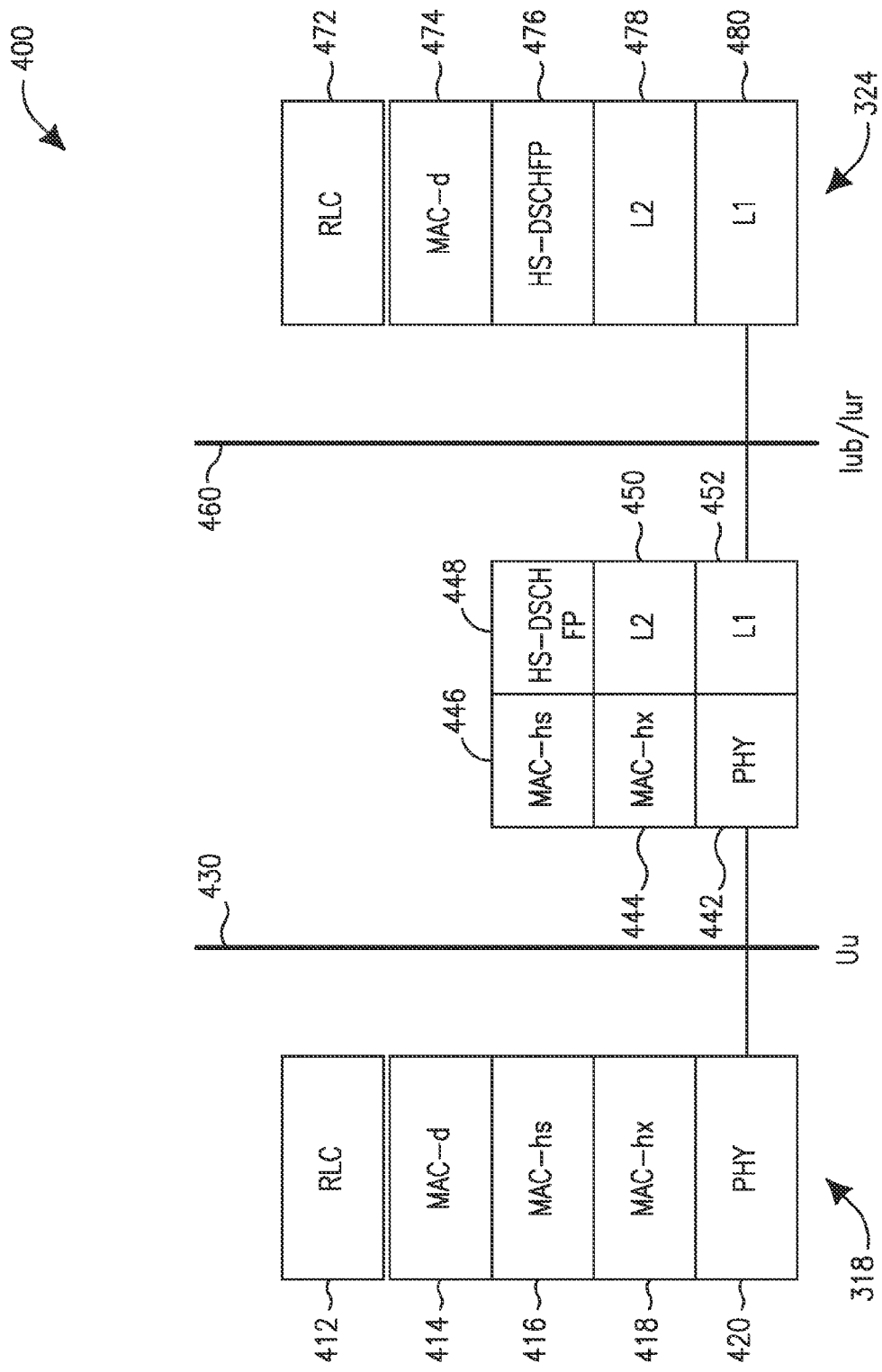

FIG. 4 illustrates a communication protocol stack adapted in accordance with some embodiments of the invention.

Figure 5:
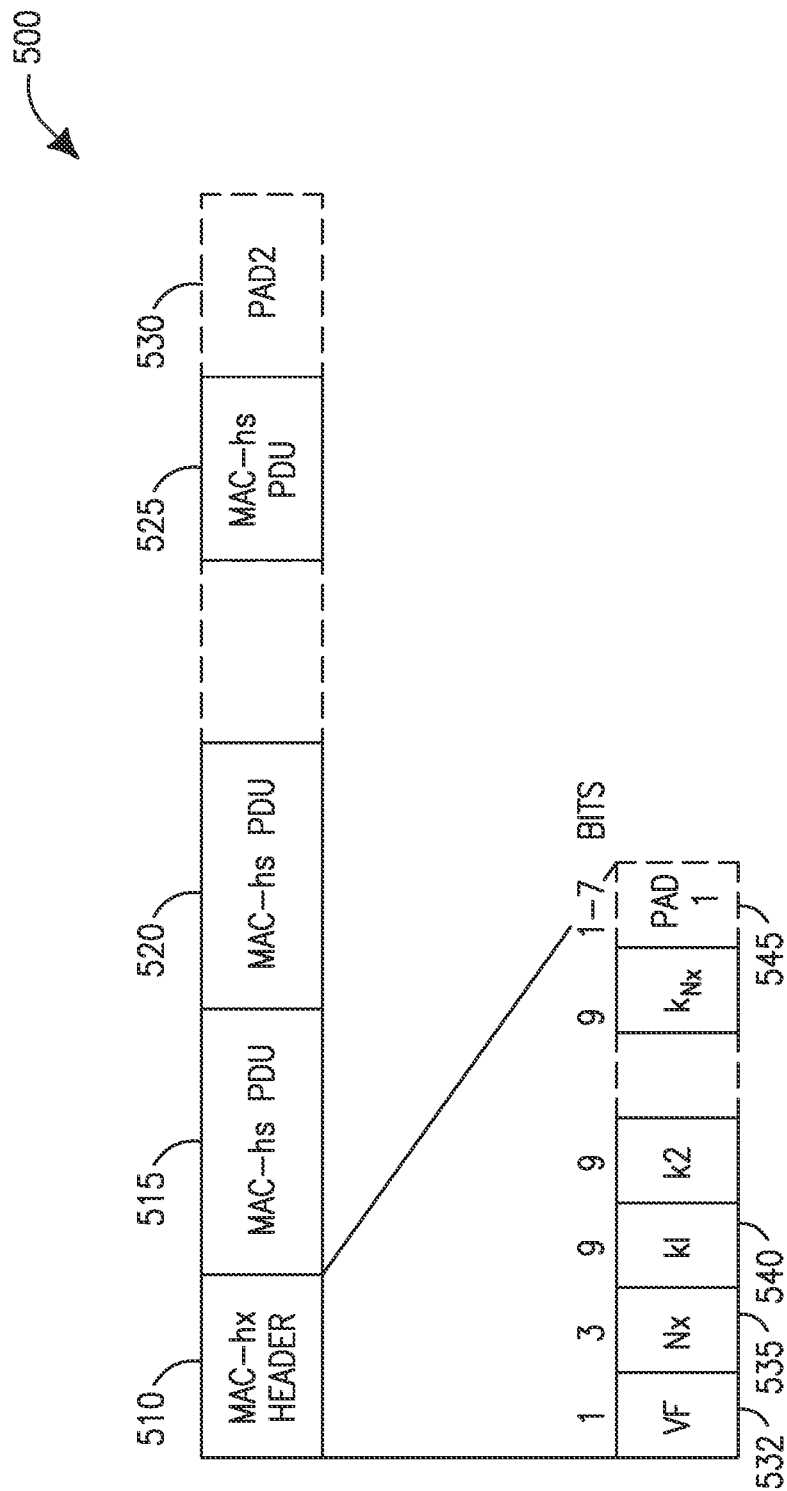

FIG. 5 illustrates a MAC-hx protocol data unit construction in accordance with some embodiments of the invention.

Figure 6:
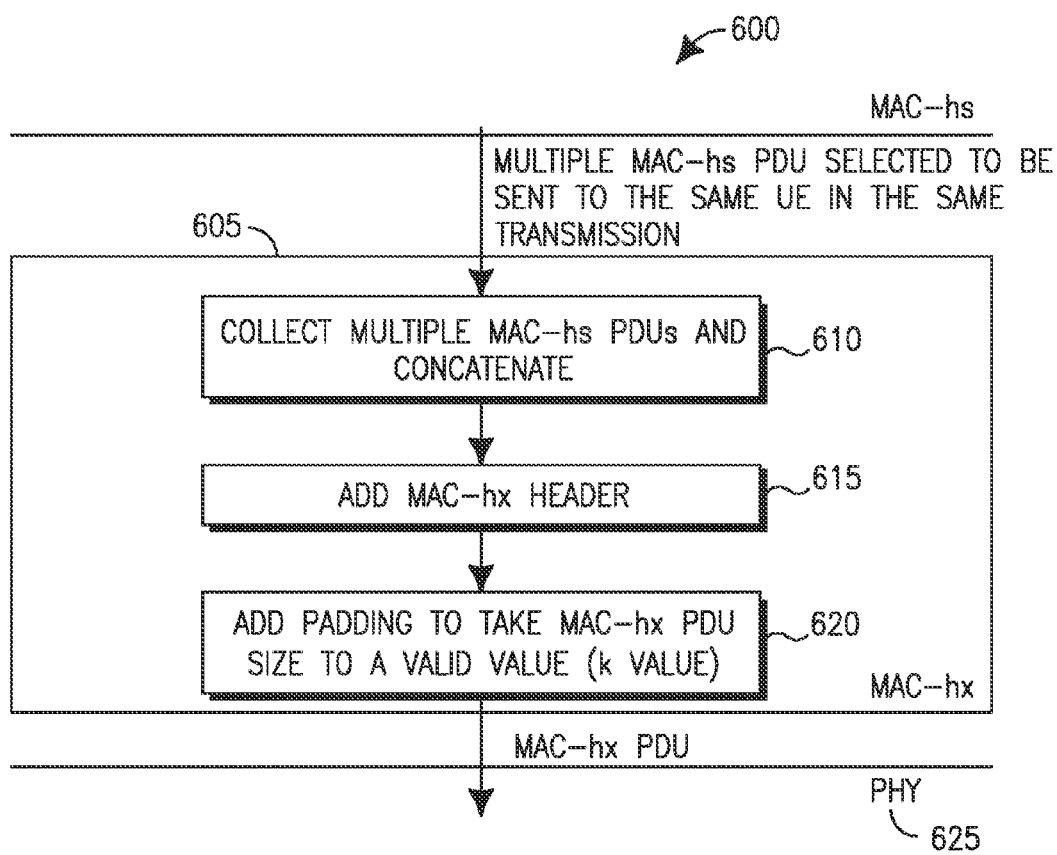

FIG. 6 illustrates a flowchart of a control flow of a MAC-hs protocol data unit within the UTRAN in accordance with some embodiments of the invention.

Figure 7:
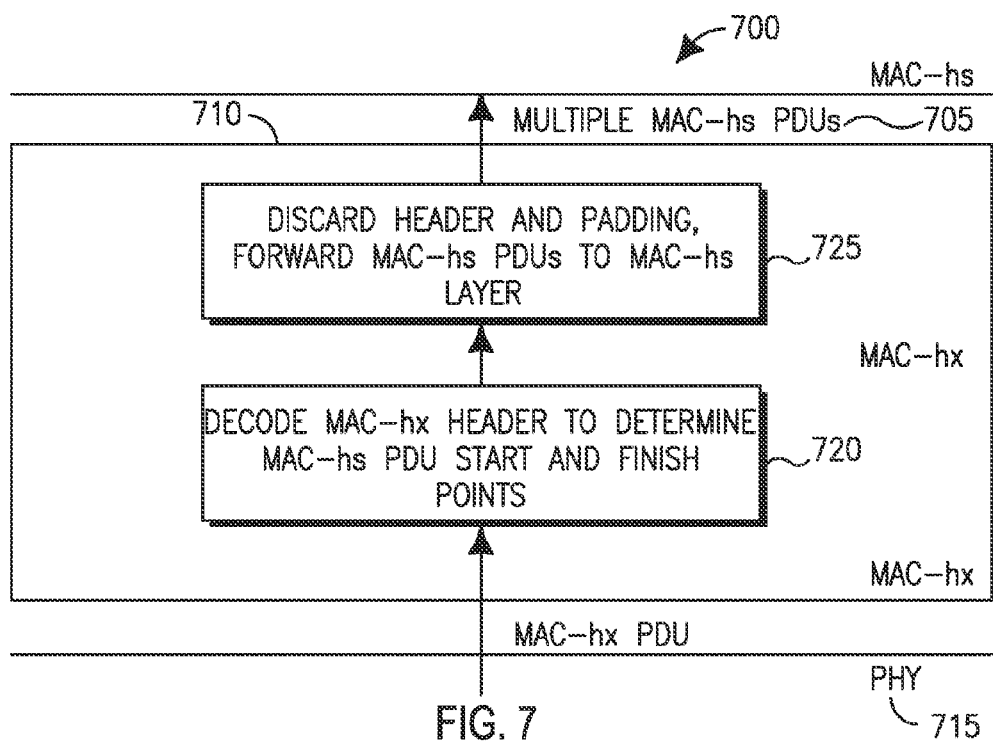

FIG. 7 illustrates a flowchart of a control flow of a MAC-hs protocol data unit within the user equipment (UE) in accordance with some embodiments of the invention.

Figure 8:
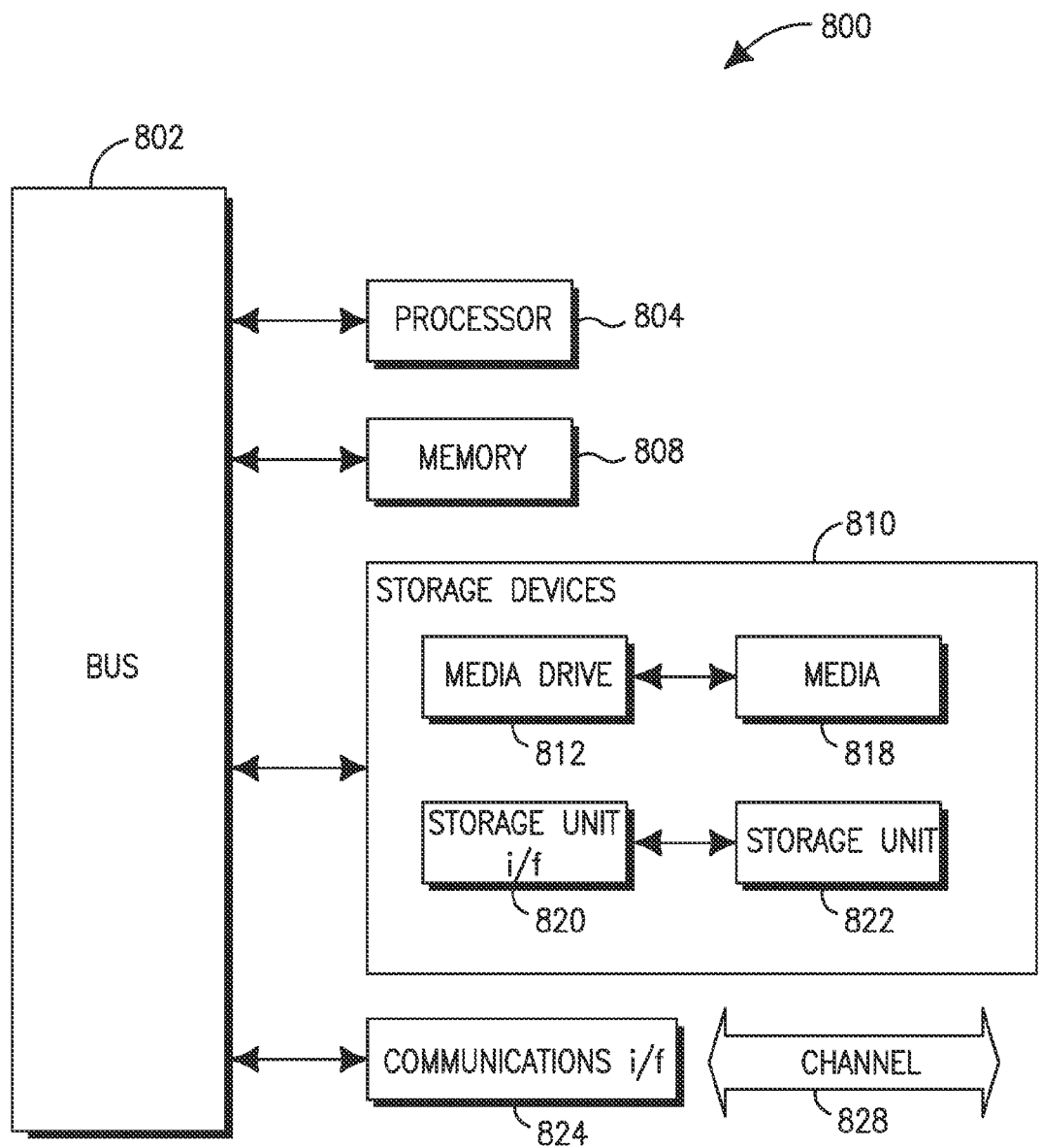

FIG. 8 illustrates a typical computing system that may be employed to implement processing functionality in embodiments of the invention.

DESCRIPTION OF EMBODIMENTS OF THE INVENTION

The following description focuses on embodiments of the invention applicable to a UMTS (Universal Mobile Telecommunication System) cellular communication system and in particular to a UMTS Terrestrial Radio Access Network (UTRAN) employing High Speed Downlink Packet Access (HSDPA) within a 3rd generation partnership project (3GPP) system. However, it will be appreciated that the invention is not limited to this particular cellular communication system, but may be applied to other cellular communication systems.

One embodiment of the invention provides an extension to the MAC layer of 3GPP HSDPA. The extension adds an extra sub-layer to HSDPA data control flow, which allows multiple MAC-hs PDUs to be sent in a same transmission time interval (TTI) to the same UE and carried by a single MAC-hx PDU. This is in contrast to the known Release 5 3GPP where only a single MAC-hs PDU is sent per TTI.

Referring first to FIG. 3, a typical, standard UMTS Radio Access Network (UTRAN) system 300 is conveniently considered as comprising: a terminal/user equipment domain 310; a UMTS Terrestrial Radio Access Network domain 320; and an infrastructure domain 330.

In the terminal/user equipment domain 310, terminal equipment (TE) 312 is connected to mobile equipment (ME) 314 via the wired or wireless R interface. The ME 314 is also connected to a user service identity module (USIM) 316; the ME 314 and the USIM 316 together are considered as user equipment (UE) 318. The UE 318 communicates data with a Node-B (base station) 322 in the radio access network domain 320 via the wireless Uu interface. Within the radio access network domain 320, the Node-B 322 communicates with a radio network controller (RNC) 324 via the Iub interface. The RNC 324 communicates with other. RNCs (not shown) via the Iur interface. The Node-B 322 and the RNC 324 together form the UTRAN 326. The RNC 324 communicates with a serving GPRS service node (SGSN) 332 in the core network domain 330 via the Iu interface. Within the core network domain 330, the SGSN 332 communicates with a gateway GPRS support node 334 via the Gn interface; the SGSN 332 and the GGSN 334 communicate with a home location register (HLR) server 336 via the Gr interface and the Gc interface respectively. The GGSN 334 communicates with public data network 338 via the Gi interface.

Thus, the elements RNC 324, SGSN 332 and GGSN 334 are conventionally provided as discrete and separate units (on their own respective software/hardware platforms) divided across the radio access network domain 320 and the core network domain 330, as shown FIG. 3.

The RNC 324 is the UTRAN element responsible for the control and allocation of resources for numerous Node-Bs 322; typically 50 to 300 Node-B's may be controlled by one RNC. The RNC also provides reliable delivery of user traffic over the air interfaces. RNC's communicate with each other (via the Iur interface)

The SGSN 332 is the UMTS Core Network element responsible for Session Control and interface to the HLR. The SGSN keeps track of the location of an individual UE and performs security functions and access control. The SGSN is a large centralized controller for many RNCs.

Such a UTRAN system and its operation are described more fully in the 3rd Generation Partnership Project technical specification documents 3GPP TS 25.401, 3GPP TS 23.060, and related documents, available from the 3GPP website at www.3gpp.org, and need not be described herein in more detail.

FIG. 4 illustrates in 400 a communication protocol stack adapted in accordance with some embodiments of the invention. The protocol stack, as known to those skilled in the art, comprises a portion of seven communication layers within the OSI (Open Systems Interconnection) reference model defined by the ISO (International Organisation for Standardisation). The protocol stack comprises layers of communication and logic elements associated with communication at those layers that are defined to handle communication between, for example, the UE 318 and a Node B 322 over the Uu interface 430 and between a Node-B 322 and a RNC 324 over the Iub/Iur interface 460.

As illustrated, the UE 318 has a radio link control layer 412 shown schematically as residing on top of a medium access control logic element/layer, which in the illustrated embodiment comprises individual MAC-d 414, MAC-hs 416 and MAC-hx 418 logic elements/layers. The MAC layers are shown schematically as residing on top of a physical logic element/layer 420.

The Node-B is illustrated schematically as also comprising individual MAC-hs 446 and MAC-hx 444 logic elements/layers residing on top of a physical logic element/layer 442 to facilitate communication with the UE 318 over the Uu interface 430. The Node-B is also illustrated schematically as comprising a HS-DSCH FP logic element/layer 448 residing on top of layer-2 logic 450 and layer-1 logic 452, which are for translating communications received from the physical logic element/layer 442 and MAC-hs 446 and MAC-hx 444 logic element/layers to a format to be understood by the RNC 324.

The RNC 324 receives signals from the Node-B across the Iub/Iur interface 460. The RNC 324 comprises a number of logic elements/layers of communication, including a radio link control layer 472 shown schematically as residing on top of a medium access control-d logic element/layer 474 and a HS-DSCH FP logic element/layer 476 (corresponding to the Node-B HS-DSCH FP logic element/layer 448). The HS-DSCH FP logic element/layer 476 is shown schematically as residing on top of a layer-2 logic element 478 and a layer-1 logic element 480.

In accordance with some embodiments of the invention, a MAC-hx sub-layer logic elements has been introduced into the UE 318 and Node-B protocol stack. In accordance with some embodiments of the invention, MAC-hx is configured as an extension to HSDPA that permits the transmission of multiple MAC-hs PDUs to the same UE within a single TTI. In some embodiments of the invention, the MAC-hx sub-layers/logic elements, 418, 444 are operable for multiplexing multiple incoming MAC-hs PDUs into MAC-hx PDUs for transmission to the same UE within a single TTI.

Thus, in order to support the operation of the proposed concatenated MAC-hs PDU, logic may be introduced into both the MAC-hs model for UTRAN side and UE side MAC-hs respectively. The logic associated with PDU concatenation in the UTRAN side may, in response to the scheduling result, form the concatenated MAC-hs PDU (MAC-hx PDU) by multiplexing a plurality of the MAC-hs PDUs from selected priority queues of the scheduled UE into a single TTI.

Similarly, in order to perform de-concatenation on the UE side, logic within the UE may be configured to receive and disassemble a concatenated MAC-hs PDU (MAC-hx PDU) and send each separated MAC-hs PDU to a re-ordering queue distribution entity. Otherwise, the logic may be operable to directly forward the received MAC-hs PDU to the re-ordering queue distribution entity.

Furthermore, in some embodiments of the invention, the MAC-hx PDUs may be generated from different re-ordering queues. Thus, at the UE side, the UE receiver receiving the multiplexed multiple MAC-hs PDUs passes the de-multiplexed MAC-hs PDUs to one of several re-ordering queues. A re-ordering queue handles data of the same priority. The re-ordering queues re-order MAC-hs PDUs, since they can be received out of sequence. Advantageously, the re-ordering is performed before the data can be delivered to the RLC layer. By using multiple re-ordering queues, it is possible to ensure that high priority data is not held up unnecessarily awaiting a successful re-transmission of a lower priority MAC-hs PDU.

In one embodiment of the invention, an inclusion of the MAC-hx logic elements/layers 418, 444 within the protocol stack is configurable by the Operations and Maintenance logic (OAM) (not shown). Configuration may be undertaken by the Element Manager (EM) of the Node B or the EM of the RNC (and signaled to the Node B over the Iub). In this manner, the OAM may configure the MAC-hx layers 418, 444 within the protocol stack as one of either of two states: 'MAC-hx on' and 'MAC-hx off'. Thus, with a 'MAC-hx off' state, the Node-B and the UE operate in accordance with the current HSDPA standard. In some embodiments of the invention, the state may be signaled to the UE in a radio bearer (RB) setup message, and to the Node B in a Physical Shared Channel Reconfiguration message.

Furthermore, in a configuration for supporting legacy UEs (for example those UEs able to decode MAC-hs only) and new UEs (for example those UEs supporting MAC-hx decoding) in the same cell, the Node B may operate with MAC-hx 'ON' for transmissions to new UEs and MAC-hx 'OFF' for transmissions to legacy UEs. This is achieved by setting the first bit (the Version Flag (VF)) appropriate to the transmission: 0 for MAC-hs PDU, 1 for MAC-hx PDU.

FIG. 5 illustrates a construction of a MAC-hx protocol data unit 500 in accordance with some embodiments of the invention. In some embodiments of the invention, the construction of the MAC-hx PDU 500 is determined by a MAC-hs scheduler (not shown). In some embodiments of the invention, the construction details, together with the MAC-hs PDUs to be carried, are passed by a primitive to the MAC-hx sub-layers/logic elements (for example MAC-hx sub-layers/logic elements 418, 444 of FIG. 4).

In some embodiments of the invention, the construction of the MAC-hx protocol data unit 500 may comprise:
(i) A MAC-hx header 510;
(ii) One or more MAC-hs PDUs 515, 520, 525; and
(iii) (optional) padding (PAD2) 530, for example if the sum of (i) and (ii) does not fit into a valid MAC-hx PDU (K value) size.

In this regard, a set of valid MAC-hx PDU sizes may be considered as the same as that already defined for MAC-hs (the values in 3GPP specification 25.321).

In accordance with some embodiments of the invention, the MAC-hx header 510 may be of variable size. For example, the MAC-hx header 510 may comprise of one or more of the following:
(i) A Version Flag (VF) field 532, which is illustrated as being set to 1
(ii) An Nx field 535, indicating a number of MAC-hs PDUs contained in the data payload. For example, the Nx field 535 may comprise three bits, thereby able to indicate a decimal number between '1' and '8';
(iii) Nx k fields 540, where k indicates the transport block (MAC-hs PDU) size index. For example, in some embodiments, the Nx k fields 540 may provide the size of each MAC-hs PDU using '9' bits;
(iv) The MAC-hx header 510 may also comprise optional PAD1 bits 545, in order to maintain the byte alignment of the first MAC-hs PDU payload. In this manner, the padding may be included to take the MAC-hx header to a byte boundary (where the PAD1 size is '1' to '7' bits). Thus, the MAC-hx receiver logic decodes the Nx and k fields and then takes the MAC-hs PDUs from the next byte boundary. If the MAC-hs PDUs are an integer number of bytes in length, this also ensures that all MAC-hs PDUs are byte aligned.

For example, in one embodiment of the invention, for TDD mode, the MAC scheduler (not shown) generates two MAC-hs PDUs to be transmitted to a single UE, one of 3408 bits (carrying ten off 336 bit MAC-d PDUs) and another of 699 bits (carrying two off 336 bit MAC-d PDUs). In this example:
VF='1'
Nx='2' (sent as three bits 001*b*);
K1=279, K2=171 (18 bits); and
PAD1 is allocated two bits.

Thus, the size of header and payload=24+3408+699=4131 bits. Furthermore, if we assume the smallest indexable PDU size is 4184 bits (k=293), then PAD2='53' bits.

In 3GPP Release 5, the MAC-hs PDU size is signaled by a separate control channel (the HS-SCCH). The signaling uses an index 'k' which (in TDD mode) is nine bits long and references a table of sizes that is known at both the transmitter (Node-B) and the receiver (UE). In accordance with some embodiments of the invention the same approach is now used to signal a 'size' of the MAC-hx PDU. Furthermore, in accordance with some embodiments, the same set of sizes are used to signal the MAC-hs PDU sizes, using k values in the MAC-hx header.

The HS-SICH channel which carries acknowledgements to the UE (in TDD mode) is also unchanged from the HS-SICH defined originally for MAC-hs operation by 3GPP. The ACK/NACK shall apply to the whole MAC-hx PDU transmission.

In order to identify whether the received PDU is a single MAC-hs PDU, or a concatenated MAC-hs PDU containing a multiplexed plurality of MAC-hs PDUs, the UE logic is configured to use a Version Flag (VF) field, providing extension capabilities of the MAC-hs PDU format. The VF field is a one bit flag and may be set to, say, '1' to indicate a concatenated MAC-hs PDU. This allows the UE to identify the nature of the transmission, without the need for additional 'out-of-band' signaling.

Thus, in some embodiments of the invention, a MAC-hs PDU concatenation scheme is proposed to support flexible MAC layer multiplexing in terms of MAC-hs PDUs from different priority queues of packet date for a single UE. This scheme is carefully designed to support backward-compatibility with the existing HSDPA standard. Furthermore, and advantageously, the scheme ensures that all existing logic supporting in MAC-hs can remain unchanged and be fully re-used in their existing format to support the invention. Moreover, the data overhead is kept to a minimum.

In the case where there are no legacy terminals, an alternative to forcing the UE to read the Version Flag, a boolean 'MAC-hx on' value may be included in a radio bearer setup message that configures HS-DSCH operation at the UE. It is assumed that the same MAC-hx state ('on' or 'off') may be used across the whole network, or a radio bearer re-configuration operation is performed when the UE re-selects a cell with the alternate MAC-hx state.

In addition, the boolean 'MAC-hx on' state may be included in the Physical Shared Channel Reconfiguration message that configures HS-DSCH operation at the Node B.

According to one embodiment of the invention, the base station or method employed by the base station may further comprise logic for concatenating multiple data packets from the same priority queue for a single remote station. This may be advantageous if it is determined later that radio conditions have deteriorated such that the MAC-hx PDU is too large for successful delivery and should be sent as smaller pieces.

Referring now to FIG. 6, a flowchart 600 illustrates a control flow of a MAC-hs protocol data unit within a Node B of the UTRAN in accordance with some embodiments of the invention. First, multiple MAC-hs PDUs are selected to be sent from the MAC-hs layer 600 to a single UE within the same transmission. The control flow comprises collecting and concatenating the multiple MAC-hs PDUs in step 610, within the MAC-hx layer 605; The construction of the MAC-hx PDU is determined by the MAC-hs scheduler. The construction details, together with the MAC-hs PDUs to be carried, are passed by a primitive to the MAC-hx layer 605. In particular, a MAC-hx header is then added in step 615, where the header is as described earlier. Padding is then added to the MAC-hx PDU, to take the MAC-hx PDU size to a valid (k) size in step 620, prior to passing the MAC-hx PDU to the physical layer 625 for transmitting to the single UE.

Referring now to FIG. 7, a flowchart 700 illustrates a control flow of a MAC-hs protocol data unit within the UE in accordance with some embodiments of the invention. A function of flowchart 700 is to disassemble incoming MAC-hx PDUs into MAC-hs PDUs. This is achieved by interpreting the MAC-hx header. Thus, the control flow of a MAC-hs protocol data unit moves from a physical layer 715 to a MAC-hx PDU, where the MAC-hx header is decoded to determine MAC-hs PDU start and finish points, as shown in step 720. In accordance with embodiments of the invention, the MAC-hx header is then discarded in step 725 together with any optional padding, and the multiple MAC-hs PDUs 710 are forwarded to the MAC-hs layer 705 for further processing.

It will be appreciated that, for clarity purposes, the above description has described embodiments of the invention with reference to different functional units and processors. However, it will be apparent that any suitable distribution of functionality between different functional units or processors, for example with respect to the concatenation or decoding logic, may be used without detracting from the invention. For example, functionality illustrated to be performed by separate processors or logic elements may be performed by the same processor or logic elements. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

While the invention has been described in terms of particular embodiments and illustrative figures, those of ordinary skill in the art will recognize that the invention is not limited to the embodiments or figures described. Although embodiments of the present invention are described, in some instances, using UMTS terminology, those skilled in the art will recognize that such terms are also used in a generic sense herein, and that the present invention is not limited to such systems.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term 'logic' herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

FIG. 8 illustrates a typical computing system 800 that may be employed to implement processing functionality in embodiments of the invention. Computing systems of this type may be used in the eNB (in particular, the scheduler of the eNB), core network elements, such as the aGW, and the UEs, for example. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special purpose processing engine such as, for example, a microprocessor, microcontroller or other control logic. In this example, processor 804 is connected to a bus 802 or other communications medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory (ROM) or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having stored therein particular computer software or data.

In some embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a universal serial bus (USB) port), a PCMCIA slot and card, etc. Software and data transferred via communications interface 824 are in the form of signals which can be electronic, electromagnetic, optical or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 808, storage device 818, or storage unit 822. These and other forms of computer-readable media may store one or more instructions for use by processor 804, to cause the processor to perform specified operations. Such instructions, generally referred to as 'computer program code' (which may be grouped in the form of computer programs or other groupings), when executed, enable the computing system 800 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage media 818, media drive 812 or communications interface 824. The control logic (in this example, software instructions or computer program code), when executed by the processor 804, causes the processor 804 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

It will be understood that the scheme for HSDPA communication described above may provide the following advantages, either singly or in any combination:

(i) Embodiments of the invention advantageously superimpose a MAC-hx layer onto the 3GPP MAC-hs layer, whilst providing additional functionality by re-configuring the transmission of a HS-SCCH 'k' value to provide an indication of a size of a MAC-hx PDU carrying multiple MAC-hs PDUs.

(ii) The MAC-hx PDU according to embodiments of the invention carries standard MAC-hs PDUs, whose sizes are defined according to the standard table of permitted sizes (there are 512 permitted sizes in TDD mode, indicated by index k), as identified in the 3GPP standard.

(iii) The provision of a MAC-hx PDU in transmitting multiple MAC-hs PDUs, in the aforementioned manner, allows multiple priority levels to be served in the same TTI, with resulting latency and throughput gains.

(iv) The scheme may operate concurrently with the 3GPP HSDPA delivery to legacy UEs sharing the same cell as new UEs supporting MAC-hx, because the HS-SCCH signaling can advantageously be used for both UE types.

(v) UEs supporting the scheme are able to roam into cells whose Node Bs do not support MAC-hx and recognise that transmissions employ MAC-hs PDUs by virtue of the Version Flag value.

It will be appreciated that the scheme for HSDPA communication described above may be carried out in software running on processors (not shown) in a Node-B and UE, and that the software may be provided as computer program elements carried on any suitable data carriers (also not shown) such as magnetic or optical computer discs.

It will be also be appreciated that the scheme for HSDPA communication described above may alternatively be carried out in hardware, for example in the form of integrated circuits (not shown) such as FPGAs (Field Programmable Gate Arrays) or ASICs (Application Specific Integrated Circuits) in the Node-B and UE.

It will further be understood that although the preferred embodiments have been described above in the context of a 3GPP UTRA TDD wireless system, the invention is not limited to this application and may be used in any suitable communication system including generally applied to any communication system employing HSDPA.

Although the invention has been described in connection with some embodiments, it is not intended to be limited to the specific form set forth herein. Rather, the scope of the invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

What is claimed is:

1. A method performed by a mobile device, the method comprising:
   receiving via a downlink data channel in a high speed downlink packet access (HSDPA) communication, a multiplexed data packet utilizing a plurality of protocol layers, the multiplexed data packet including:
   a header, including:
      an indication of a number of multiple data packets in the multiplexed data packet;
      multiple size indications each to indicate a size of a respective one of the multiple data packets; and
      first padding bits to align the header with a byte boundary so that the multiple data packets are also byte aligned;
   the multiple data packets following the first padding bits and including data packets for a plurality of priority queues; and
   second padding bits following the multiple data packets to ensure that a sum of a size of the header and sizes of the multiple data packets is a predetermined size for the multiplexed data packet;
   processing the multiplexed data packet using a first media access control (MAC) protocol layer from the plurality of protocol layers, the processing including decoding the header, removing the first padding bits from the header, and providing the multiple data packets to a re-ordering queue distribution function; and
   re-ordering the multiple data packets at the re-ordering queue distribution function.

2. The method of claim 1, wherein the multiple data packets include concatenated multiple MAC-hs data packets.

3. The method of claim 1, further comprising:
   receiving, by the mobile device via a separate signalling channel, an indicator of a size of the multiplexed data packet.

4. The method of claim 3, wherein the indicator is received via a high-speed shared control channel (HS-SCCH).

5. The method of claim 1, wherein:
   the header further includes a single bit version flag at a beginning of the header set to indicate that the multiplexed data packet includes the multiple data packets; and
   the decoding includes decoding the version flag to identify that the multiplexed data packet includes the multiple data packets.

6. The method of claim 1, wherein the MAC protocol layer is a high speed MAC (MAC-hs) protocol layer.

7. A mobile device comprising:
   a receiver configured to receive, via a downlink data channel in a high speed downlink packet access (HSDPA) communication, a multiplexed data packet utilizing a plurality of protocol layers, the multiplexed data packet including:
   a header, including:
      an indication of a number of multiple data packets in the multiplexed data packet;
      multiple size indications each to indicate a size of a respective one of the multiple data packets; and
      first padding bits to align the header with a byte boundary so that the multiple data packets are also byte aligned;
   the multiple data packets following the first padding bits and including data packets for a plurality of priority queues; and
   second padding bits following the multiple data packets to ensure that a sum of a size of the header and sizes of the multiple data packets is a predetermined size for the multiplexed data packet; and
   at least one processor configured to:
      process the multiplexed data packet using a media access control (MAC) protocol layer from the plurality of protocol layers by decoding the header, removing the first padding bits from the header, and providing the multiple data packets to a re-ordering queue distribution function; and
      re-order the multiple data packets using the re-ordering queue distribution function.

8. The mobile device of claim 7, wherein the multiple data packet include concatenated multiple MAC-hs data packets.

9. The mobile device of claim 7, wherein:
   the receiver is further configured to receive, via a separate signalling channel, an indicator of a size of the multiplexed data packet.

10. The mobile device of claim 9, wherein the indicator is received via a high-speed shared control channel (HS-SCCH).

11. The mobile device of claim 7, wherein:
    the header further includes a single bit version flag at a beginning of the header set to indicate that the multiplexed data packet includes the multiple data packets; and the at least one processor is configured to decode by decoding the version flag to identify that the multiplexed data packet includes the multiple data packets.

12. The mobile device of claim 7, wherein the MAC protocol layer is a high speed MAC (MAC-hs) protocol layer.

13. A non-transitory computer readable storage media encoded with instructions that, when executed by a processor of a mobile device, cause the processor to:
receive via a downlink data channel in a high speed downlink packet access (HSDPA) communication, a multiplexed data packet utilizing a plurality of protocol layers, the multiplexed data packet including:
a header, including:
an indication of a number of multiple data packets in the multiplexed data packet;
multiple size indications each to indicate a size of a respective one of the multiple data packets; and
first padding bits to align the header with a byte boundary so that the multiple data packets are also byte aligned;
the multiple data packets following the first padding bits and including data packets for a plurality of priority queues; and
second padding bits following the multiple data packets to ensure that a sum of a size of the header and sizes of the multiple data packets is a predetermined size for the multiplexed data packet;
process the multiplexed data packet using a first media access control (MAC) protocol layer from the plurality of protocol layers, the instructions to cause the processor to process including instructions to cause the processor to decode the header, remove the first padding bits from the header, and provide the multiple data packets to a re-ordering queue distribution function; and
re-order the multiple data packets at the re-ordering queue distribution function.

14. The computer readable storage media of claim 13, further comprising instructions to cause the processor to:
receive via a separate signalling channel, an indicator of a size of the multiplexed data packet.

15. The computer readable storage media of claim 14, wherein the indicator is received via a high-speed shared control channel (HS-SCCH).

16. The computer readable storage media of claim 13, wherein:
the header further includes a single bit version flag at a beginning of the header set to indicate that the multiplexed data packet includes the multiple data packets; and
the instructions to cause the processor to decode include instructions to cause the processor to decode the version flag to identify that the multiplexed data packet includes the multiple data packets.

* * * * *